United States Patent Office 2,891,742
Patented June 23, 1959

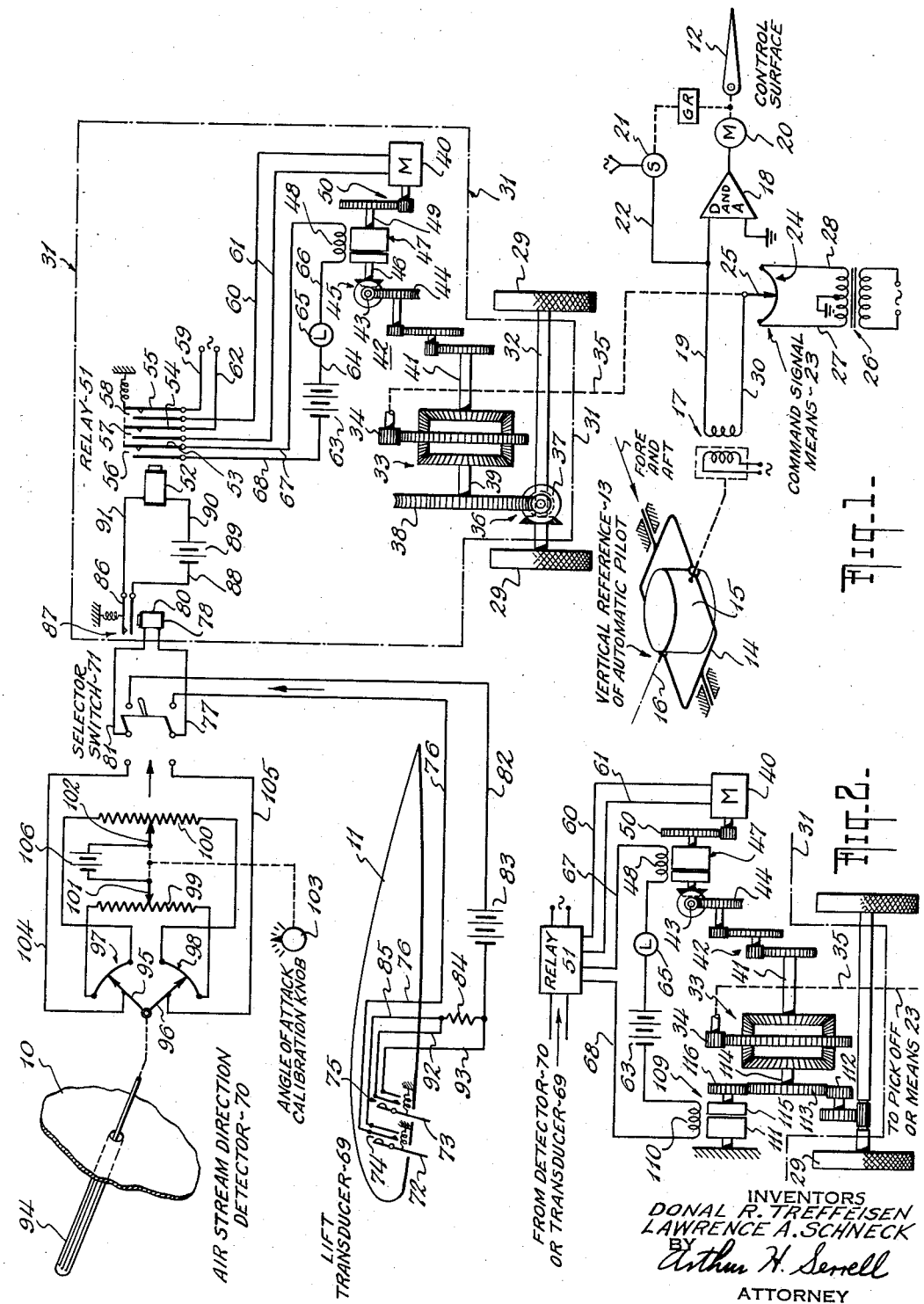

2,891,742

FLIGHT CONTROL SYSTEM FOR AIRCRAFT

Donal R. Treffeisen, Glen Cove, and Lawrence A. Schneck, New York, N.Y., assignors to Sperry Rand Corporation, a corporation of Delaware Application May 29, 1956, Serial No. 588,055

18 Claims. (Cl. 244—77)

This invention relates generally to a flight control system for aircraft. More particularly, the invention concerns a system for monitoring the flight attitude of an aircraft that is automatically effective through an automatic pilot. The improved system utilized with a stall warning or sensing means functions automatically to change the attitude of the craft about its pitch axis through the automatic pilot to prevent the craft from stalling. The system operates to prevent stalls that heretofore could be caused either by the automatic pilot or by human pilot initiated command signals to the automatic pilot. The improved flight control system provides corrective action of a reproducible character under all flight conditions of operation of the aircraft. It is further applicable to monitor the craft about other than its pitch axis so that no limitation of the invention is inferred in the illustrative embodiment of the system shown in the drawing wherein the system includes specific airstream direction detector and lift transducer elements.

One of the objects of the present invention is to provide a monitoring system of the class described effective independently of the craft's flight condition to operate automatically to remove the craft from an attitude in which its angle of attack is dangerously high. The craft is accordingly maneuvered about its axis away from a stall condition.

One of the features of the invention resides in provision of a dually operated command signal pick-off for the automatic pilot of the system whose movable part is compatible with the attitude of the aircraft at all times.

Another feature of the invention is contained in the inclusion in the system of a means for providing tactile warning to the human pilot of the approach of the craft to a stall condition, such warning being noted by the pilot by frictional restraint of the manually settable command input member of the system.

A further object of the invention is to provide a monitoring system of the character described that avoids the inclusion of any recentering or resetting elements therein. The improved system does not introduce steady state errors in the automatic pilot that require adjustment to correct, the system being effective to operate and reoperate at all times without intervening adjustment.

A further feature of the invention is provided by a differential means for operating the command pick-off of the automatic pilot of the system, one of whose inputs is obtained from a manually settable member through an irreversible connection and the other of whose inputs is obtained from a suitable drive means through a second irreversible connection.

Other objects, features and structural details of the invention will become apparent from the following detailed description of the accompanying illustrative drawings, in which, Fig. 1 is a schematic view and wiring diagram of a monitoring flight control system for aircraft embodying the present inventive concepts, and Fig. 2 is a partial view similar to Fig. 1, showing a modification of the system in which the tactile warning means is included.

With reference to Fig. 1 of the drawing, the illustrated components of the aircraft whose flight path is controlled by the improved system include fuselage area 10, wing section 11, and control surface or elevators 12. The automatic pilot of the system operates in a conventional manner to stabilize the craft about an axis such as the pitch axis being effective through the elevator control surface 12. The components of the automatic pilot shown in Fig. 1 include a vertical reference 13 depicted in the form of a gyro vertical with a conventional gimbal ring 14 and rotor case 15. As shown in the drawing by the arrow with the fore and aft designation, the ring 14 of the reference instrument is situated in the craft with its axis parallel to or contiguous with the fore and aft axis of the craft. The minor axis 16 of the reference 13 or axis of case 15 which is perpendicular to the axis of the ring 14 is accordingly normally horizontal and parallel to or contiguous with the pitch axis of the craft. The reference instrument shown further includes a suitable pitch pick-off 17 whose wound rotor part is fixedly connected to the case 15 of the reference instrument and whose wound stator is fixed to the ring 14. As represented, the rotor part of the pick-off is energized from a suitable source of alternating current electrical energy. The components of the pick-off 17 are arranged to produce an electrical output signal whose amplitude depends on the extent of the angular deviation of the craft from the reference attitude established by the vertical reference 13 with respect to its pitch axis and whose phase depends on the sense of such deviation.

A further component of the automatic pilot shown in the drawing is a suitable phase sensitive detector and amplifier represented at 18. The output of the reference pick-off 17 fed by way of lead 19 to amplifier 18 is effective to control the operation of a servomotor component 20 and the surface 12 which is drivably connected thereto. Other components of the automatic pilot represented in the drawing include a feedback signal means shown as a pick-off or synchro 21 similar to pick-off 17 whose energized rotor part is operatively connected to the shafting interconnecting the motor 20 and surface 12 through suitable reduction gearing. The output of pick-off 21 is fed amplifier 18 by way of lead 22, the signal opposing the input to the amplifier from the pick-off 17. The command signal means for the automatic pilot is indicated at 23. Such means introduces a signal to the automatic pilot that effectively modifies the null defined by the vertical reference 13 and operates to change the attitude of the craft about its axis. In the instant case, the signal means is effective through operation of the automatic pilot and elevator 12 to maneuver the craft about its pitch axis. Means 13 may be provided by a suitable synchro, pick-off or signal generator with a movable or rotor part and a relatively fixed part. As shown, the command signal means is provided by a fixed potentiometer 24 with a slider or movable part 25. The potentiometer 24 receives energy from a suitable alternating current electrical supply by way of a transformer 26 whose secondary winding includes a center tap connection thereto with a ground connected lead. Leads 27 and 28 connect the secondary winding of the transformer 26 to the potentiometer 24. The described arrangement provides an output of the character of pick-off 17 and a null signal where the slider 25 is at the midpoint of the potentiometer. In order to maneuver the craft through the automatic pilot to cause the same to assume a climb or dive attitude, the human pilot heretofore exerted direct control of the slider 25 or its equivalent through a suitable manually settable member or control knob such as herein indicated at 29. The signal means 23 shown in Fig. 1 is connected in series with the pick-off 17, the lead 30 interconnecting the slider 25 and the stator of the pick-off 17. With a command input signal introduced in the automatic pilot, the amplifier 18 provides a corresponding output that operates the servomotor 20 which in turn causes the surface 12 to move in the proper sense to obey the command. As the craft changes attitude or maneuvers according to the influence of the surface 12, the feedback pick-off 21 introduces a signal input to amplifier 18 that balances the signal inputs thereto from the command signal means 23 and the pick-off 17. The servomotor 20 then stops and the craft continues in the selected nose-up or down attitude until the human pilot readjusts the slider 25 to its midpoint location on the potentiometer 24. With a null command input, the automatic pilot functions under control of pick-offs 17 and 21 to operate the servomotor 20 to urge the surface 12 so as to restore the craft to straight and level flight.

The manually settable member of the improved system or pitch command knob 29 is represented as an element that is rotatably mounted in a suitable box 31 outlined in Fig. 1 that is located on the instrument panel of the craft in a position wherein the exposed dual knobs 29 on common shaft 32 are accessible to the human pilot. In the arrangement shown in Fig. 1, the output of a differential or differential means 33 within box 31 controls the movable element or slider 25 of the command signal means 23. The operative connection between these parts shown in Fig. 1 includes pinion 34 and shafting 35. An input means to the differential 33 is provided by an input connection that includes the manually settable member or knob 29, shaft 32, bevel gearing 36, and an irreversible motion transmitting means or connection consisting of worm gear 37 and meshing wheel 38 whose shaft 39 is directly connected to the differential. In the construction shown, adjustment of the knob 29 by the human pilot results in transmission of motion through the irreversible connection to the differential 33 and accordingly to the slider 25 of the command signal means. Due to the inclusion of the irreversible connection in the system between the pilot's command knob 29 and the differential 33, the monitoring controls provided are unable to effect movement of the manually settable means 29 which remain solely under the control of the human pilot.

The monitoring means of the system operates to control the signal means 23 through the second input to the differential 33. As shown, the second input means or connection includes a drive or motive means in the form of an electric motor 40. The operative connections between the differential 33 and motor 40 include differential input shaft 41, reduction gearing 42, an irreversible motion transmitting means or connection in the form of worm gear 43 and wheel 44, bevel gears 45, shafting 46 to the gears 45, a normally open electromagnetic clutch 47 with a control winding 48, shafting 49 and gear connection 50 between the shafting 49 and the shaft of the electric motor 40. The clutch 47 may be of the type disclosed in U.S. Letters Patent No. 2,751,056, to E. F. Aumuller et al. wherein the control winding is designated at 53 and the cooperating rotative parts are constituted by an armature disc 28 and wheel 47. The monitoring means of the system further includes a relay 51 with a control winding 52 and the ganged armature elements 53, 54 and 55. As shown, elements 53, 54 and 55 provide contact parts for three normally open switches 56, 57 and 58 that are closed when the relay coil 52 is energized. The drive means 40 may be a conventional form of alternating current electric motor that is connected to a suitable supply source upon closure of the switches 57 and 58. The energizing circuit shown in Fig. 1 includes lead 59 to the source, closed switch 58, lead 60 to the motor 40, the motor 40, lead 61 from the motor 40, closed switch 57, and return lead to the source. Switch 56 of the relay 51 is effective simultaneously to close a circuit that energizes the clutch coil 48 and accordingly engages the normally open clutch 47. The circuit shown in the drawing to engage the clutch 47 includes battery 63, lead 64, lamp 65, lead 66 to the clutch operating winding 48, lead 67 from the winding 48 to the closed switch 56 and return lead 68 to the battery 63. The lamp 65 in this normally open circuit is illuminated when the circuit is closed and provides visual warning to the human pilot that the monitoring means of the system is in operation. The lamp 65 is located in a position in the control box 31 on the instrument panel of the craft where it is readily observed by the human pilot. The monitoring means of the system operates to close the clutch 47 and energize the electric motor 40. The second input means or connection to the differential 33 is driven by the energized motor 40, by way of gears 50, closed clutch 47, the irreversible transmitting means or connection constituted of worm gear 43 and wheel 44, and the reduction gearing 42 to the differential input shaft 41. This input results in an output from the differential that is effective to automatically monitor the automatic pilot through the command signal means 23. When the lamp 65 is illuminated, the arrangement is such that the human pilot recognizing the condition can assist the action of the monitoring motor 40 by appropriate movement of the knob 29. The motor 40 when energized can always provide an appropriate corrective input to the differential that is greater than the input obtainable from the human pilot through the knob 29 in the improper direction. The slider 25 is accordingly moved to maneuver the craft automatically through the automatic pilot in the correct direction.

The monitoring system shown in Fig. 1 includes means for sensing the approach of the craft to a stall condition. Relay 51 of the combination provides the means responsive to the sensing means for rendering both the drive means 40 and the clutch 47 effective. With this type of monitor, the control surface 12 constitutes the elevators of the craft and the manually settable means are the pitch command knob or knobs 29 on the box 31. The command signal means 23 operates through the automatic pilot to change the attitude or maneuver the craft about its pitch axis. The input to the differential 33 from driving motor 40 operates the slider 25 in the proper sense to maneuver the craft automatically away from the stall condition sensed by the sensing means.

Means including a lift transducer 69 or an airstream direction detector 70 provide alternative stall sensors for the system either of which are included thereon through the double pole double throw selector switch 71. The lift measuring means of the monitor is rendered effective when the selector switch 71 is closed in the right hand position shown in Fig. 1. As shown, the lift transducer includes two vanes 72 and 73 which extend into the airstream of the craft. The vanes are pivoted spring biased elements that respectively control the closure of the normally open switches 74 and 75. The vanes are located at different positions along a chord of the wing section of the craft and operate to sense an approaching stall condition. As the angle of attack of the craft increases, the stagnation point of the airflow pattern moves rearwardly as viewed in Fig. 1 along the wing section of the craft. The further aft the stagnation point moves the nearer the craft is to stalling. Accordingly, the location of the vanes in the wing section depends on the particular aircraft in which the system is used and the range of operation that is desired to assure safety. In operation, the forward vane 72 is first effective to close switch 74. This closes a circuit consisting of lead 76, switch 74, lead 77, the coil 78 of a relay 88, lead 81, switch 71, lead 82, battery 83, resistor 84 and return lead 85. Due to the inclusion of the resistor in the described circuit, the current therein is insufficient to effect operation of the normally open relay 80. Relay 88, as shown, controls the operation of an armature 86 adapted to close switch 87 and a circuit for energizing the coil 52 of relay 51 of the monitoring means. This circuit includes switch 87, lead 88, a battery 89, lead 90 to coil 52, and return lead 91 to the switch. As the craft further approaches a condition of stall, the stagnation points move further aft in relation to the wing section and causes operation of vane 73 to close its related switch 75. Lead 92 to lead 85, and lead 93 to the battery 83 close the heretofore described circuit with the resistor 84 bypassed. Accordingly, the current carried by the circuit is now sufficient to operate the relay 80 to close the switch 87 and render the relay 51 operative. The normally ineffective monitoring means of the system is accordingly rendered effective. Operation of motor 40 through the closed clutch 47 drives the differential 33 and slider 25 to maneuver the craft automatically away from the stall condition. As the stagnation point moves forwardly again due to the operation of the monitor, switch 75 opens first and the resistor 84 is again included in the control circuit. The relay 80 of the system however remains closed with the reduced current until the craft has maneuvered to an attitude where the stagnation point is ahead of vane 72. At such time both switches 74 and 75 are open and the circuit to the relay 80 is broken. At this point, the monitoring means ceases functioning the lamp 65 going out and the motor 40 and clutch 47 returning to their normally ineffective condition.

The preferred controller for the monitoring means provides an angle of attack measuring device constituted of an airstream direction detector 70 and a bridge circuit with a calibration knob which selects the angle of attack at which the preventive action will begin. The detector 70 shown in Fig. 1 is a generally rotatable cylindrical probe 94 extending horizontally from the fuselage 10 of the craft in the airstream of the craft. The probe 94 includes two longitudinally parallel slots therein that are presented to the airstream. The slots are symmetrical about a plane which passes through the center of rotation of the probe and bisects the angle between the slots. The detector senses change in the angle of attack of the craft as the same varies with the local airstream direction in the vicinity of the probe. As shown, the probe 94 operates the wipers 95, 96 of the respective potentiometers 97, 98. The potentiometers 97 and 98 in the arrangement illustrated are connected in a bridge circuit with potentiometers 99 and 100 with respective sliders 101, 102. The sliders 101 and 102 are adjustably set by an angle of attack selector knob 103. A battery 106 supplies direct current energy to the bridged potentiometers, the same being connected across the sliders 101 and 102. The output of the bridge is utilized to control the relay 80 by way of the output leads 104 to wiper 95 and 105 to wiper 96 which respectively connect with leads 81 and 87 when the selector switch 71 is closed in the left hand position thereof as viewed in Fig. 1. Knob 103 is set with relation to a suitable scale for a particular aircraft so that the output thereof is sufficient to render the relay 80 and monitoring means of the system effective at an angle of attack in which the craft is approaching a stall condition. The system remains effective with motor 40 operating and the signal means slider 25 moving to cause the craft to change its pitch attitude until such time that the output of the bridge is insufficient to operate the relay 80 and accordingly the relay 51. The operations of motor 40 do not result in movement of the pitch knob due to the presence of the irreversible input connection 37. Also, input from the knob 29 does not result in any change in the position of the second input to the differential 33 because of the second irreversible input connection 43. The position of the slider 25 of the command signal means 23 is compatible with the attitude of the craft at all times whether operation is initiated through knob 29 or motor 40 or both. Where the craft is flying in a continuous out of trim though safe attitude condition, the human pilot through proper manipulation of knob 29 can restore the craft to a condition of straight and level flight with the output of the command signal means 23 at a null.

Fig. 2 of the drawing, shows an embodiment of the present inventive concepts in which tactile warning means are included in the monitoring means of the system. This means is effective to frictionally engage the manually settable means or knob 29 of the combination to restrict the operation of the same by the human pilot. Accordingly, where the human pilot is commanding additional up elevator beyond the safe limits designed in the system, he is able to feel the condition by the frictional restraint placed on knob 29. The monitoring means in this embodiment of the invention incorporates within box 31, a motion stopping means or friction brake such as an additional electromagnetic brake 109. The winding for the normally open brake 109 is indicated at 110. Winding 110, as shown, is situated in series in the circuit containing winding 48 controlling the operation of clutch 47. In this arrangement, lead 68 from the switch 56 is connected to one end of the winding 110 and the other end thereof is connected to the battery 63. A non-rotating element 111 of the brake 109 is slidably mounted in the box 31 of the structure. The input means or connection to the differential 33 from knob 29 in this arrangement includes gearing 112 with drive pinion 113 and shaft 114 therefrom. The rotatable element 115 of the brake 109 is driven through a shaft and pinion 116 that meshes with drive pinion 113. The brake 119 may be an electro-mechanical component of the type shown in heretofore noted U.S. Letters Patent No. 2,751,056 in which one of the rotating parts is fixed to provide the equivalent of the non-rotating element 111. The brake 109 in this arrangement serves the function of the irreversible transmitting means in the input connection from knob 29 to differential 33 shown in Fig. 1. In the embodiment shown in Fig. 2 with operation of the monitoring means, brake 109 and clutch 47 are closed simultaneously. The frictionally engaged faces of the brake 109 restrain the input connection to the differential 33 to give tactile warning to the human pilot of the operation of the monitoring means. The engaged faces of the brake 109 further provide a frictional brake that restricts any input to the differential 33 from the knob 29. The input to the differential 33 from motor 40 which is energized at the same time the brake 119 and clutch 47 are closed is entirely effective to operate the signal means 23 inasmuch as the knob or manually command input means 29 to the differential is stopped or restrained by the brake 109 at such time.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. The combination, in a monitoring flight control system for aircraft, of an automatic pilot having signal means operable to change the attitude of the craft about an axis, differential means having an output operatively connected to said signal means, input means to said differential means including manually settable means for commanding a change in the attitude of the craft about said axis and an irreversible transmitting connection, a second input means to said differential means including normally ineffective drive means and a second irreversible transmitting connection, and monitoring means for the system operable to render said drive means effective.

2. The combination, in a monitoring flight control system for aircraft, of an automatic pilot with a pick-off having a pitch command signal output, a differential for operating said automatic pilot pick-off, an input connection to said differential including a manually settable knob and irreversible motion transmitting means, a second input connection to said differential including a normally ineffective motive means and a second irreversible motion transmitting means, and monitoring means for the system operable to render said motive means effective.

3. The combination, in a monitoring flight control system for aircraft, of an automatic pilot with a generator providing an output signal operable to maneuver the craft about an axis, a differential connected to the rotor of said generator, an input connection to said differential including a manually settable member and irreversible motion transmitting means, a second input connection to said differential including a normally unenergized electric motor, a normally open clutch and a second irreversible motion transmitting means, and monitoring means for the system operable to close said clutch and energize said electric motor.

4. The combination, in a stall monitoring flight control system for aicraft, of an automatic pilot having signal means operable to change the attitude of the craft about its pitch axis, differential means having an output operatively connected to said signal means, input means to said differential means including manually settable means for commanding a change in the pitch attitude of the craft, stall monitoring means for the system including normally ineffective motion stopping means for the command input means, a second input means to said differential means including normally ineffective drive means and an irreversible transmitting connection, means for sensing the approach of the craft to a stall condition, and means responsive to said sensing means for rendering both said motion stopping means and drive means effective, said monitoring means operating with the command input means stopped and the second input means driving the signal means of the system to maneuver the craft automatically away from the stall condition sensed by said sensing means.

5. The combination, in a stall monitoring flight control system for aircraft, of an automatic pilot with a pick-off having a pitch command signal output, a differential for operating said automatic pilot pick-off, an input connection to said differential including a manually settable pitch knob, stall monitoring means for the system including a normally ineffective brake for engaging the knob input connection frictionally, a second input connection to said differential including a normally ineffective motive means and an irreversible motion transmitting device, means for sensing the approach of the craft to a stall condition, and means operated by said sensing means for rendering both said brake and said motive means effective, said monitoring means operating with the manually settable input connection frictionally engaged and the second input connection driving the pick-off of the system to change the pitch attitude of the craft automatically away from the stall condition sensed by said sensing means.

6. The combination, in a stall monitoring flight control system for aircraft, of an automatic pilot with a generator providing an output signal operable to maneuver the craft about its pitch axis, a differential connected to the rotor of said generator, an input connected to said differential including a manually settable member, stall monitoring means for the system including a normally open brake for engaging the manually settable member input connection frictionally, a second input connection to said differential including a normally unenergized electric motor, a normally open clutch, and an irreversible motion transmitting device, means for sensing the approach of the craft to a stall condition, and means operated by said sensing means for closing said brake and clutch and energizing said motor, said monitoring means operating with the manually settable input connection frictionally engaged and the second input connection driven by said energized motor through the closed clutch controlling the generator to maneuver the craft automatically about its pitch axis away from the stall condition sensed by said sensing means.

7. The combination, in a stall monitoring flight control system for aircraft, of an automatic pilot having signal means operable to change the attitude of the craft about its pitch axis, differential means having an output operatively connected to said signal means, input means to said differential means including manually settable means for commanding a change in the pitch attitude of the craft, stall monitoring means for the system including normally ineffective motion stopping means for the command input means, a second input means to said differential means including normally ineffective drive means and an irreversible transmitting connection, an angle of attack measuring device, and means responsive to said device upon approach of the craft to a stall condition for rendering both said motion stopping means and drive means effective, said monitoring means operating with the command input means stopped and the second input means driving the signal means of the system to maneuver the craft automatically away from the stall condition.

8. The combination, in a stall monitoring flight control system for aircraft, of an automatic pilot with a pick-off having a pitch command signal output, a differential for operating said automatic pilot pick-off, an input connection to said differential including a manually settable pitch knob, stall monitoring means for the system including a normally ineffective brake for engaging the knob input connection frictionally, a second input connection to said differential including a normally ineffective motive means and an irreversible motion transmitting device, an angle of attack measuring device, and means operated by said angle of attack measuring device upon approach of the craft to a stall condition for rendering both said brake and said motive means effective, said monitoring means operating with the manually settable input connection frictionally engaged and the second input connection driving the pick-off of the system to change the pitch attitude of the craft automatically away from the stall condition.

9. The combination, in a stall monitoring flight control system for aircraft, of an automatic pilot with a generator providing an output signal operable to maneuver the craft about its pitch axis, a differential connected to the rotor of said generator, an input connection to said differential including a manually settable member, stall monitoring means for the system including a normally open brake for engaging the member input connection frictionally, a second input connection to said differential including a normally unenergized electric motor, a normally open clutch, and an irreversible motion transmitting device, an angle of attack measuring device, and means operated by said angle of attack measuring device upon approach of the craft to a stall condition for closing said brake and clutch and energizing said motor, said monitoring means operating with the manually settable input connection frictionally engaged and the second input connection driven by said energized motor through the closed clutch controlling the generator to maneuver the craft automatically about its pitch axis away from the stall condition.

10. The combination, in a stall monitoring flight control system for aircraft, of an automatic pilot having signal means operable to change the attitude of the craft about its pitch axis, differential means having an output operatively connected to said signal means, input means to said differential means including manually settable means for commanding a change in the pitch attitude of the craft, stall monitoring means for the system including normally ineffective motion stopping means for the command input means, a second input means to said differential means including normally ineffective drive means and an irreversible transmitting connection, means providing a measure of the lift of the craft, and means responsive to said lift measuring means upon approach of the craft to a stall condition for rendering both said motion stopping means and drive means effective, said monitoring means operating with the command input means stopped and the second input means driving the signal means of the system to maneuver the craft automatically away from the stall condition.

11. The combination, in a stall monitoring flight control system for aircraft, of an automatic pilot with a pick-off having a pitch command signal output, a differential for operating said automatic pilot pick-off, an input connection to said differential including a manually settable pitch knob, stall monitoring means for the system including a normally ineffective brake for engaging the knob input connection frictionally, a second input connection to said differential including a normally ineffective motive means and an irreversible motion transmitting device, means providing a measure of the lift of the craft, and means operated by said lift measuring means upon approach of the craft to a stall condition for rendering both said brake and said motive means effective, said monitoring means operating with the manually settable input connection frictionally engaged and the second input connection driving the pick-off of the system to change the pitch attitude of the craft automatically away from the stall condition.

12. The combination, in a stall monitoring flight control system for aircraft, of an automatic pilot with a generator providing an output signal operable to maneuver the craft about its pitch axis, a differential connected to the rotor of said generator, an input connection to said differential including a manually settable member, stall monitoring means for the system including a normally open brake for engaging the member input connection frictionally, a second input connection to said differential including a normally unenergized electric motor, a normally open clutch, and an irreversible motion transmitting device, means providing a measure of the lift of the craft, and means operated by said lift measuring means upon approach of the craft to a stall condition for closing said brake and clutch and energizing said motor, said monitoring means operating with the manually settable input connection frictionally engaged and the second input connection driven by said energized motor through the closed clutch controlling the generator to maneuver the craft automatically about its pitch axis away from the stall condition.

13. The combination, in a stystem of the class described, of an automatic pilot having a signal means operable to change the attitude of the craft about an axis, differential means having an output operatively connected to said signal means, input means to said differential means including manually settable means for commanding a change in the attitude of the craft, normally ineffective tactile warning means for frictionally engaging the command input means, a second input means to said differential means including normally ineffective drive means and an irreversible transmitting connection, and monitoring means for the system operable to render both said warning means and drive means effective.

14. The combination, in a system of the class described, of an automatic pilot with a pick-off having a command signal output, a differential for operating said automatic pilot pick-off, an input connection to said differential including a manually settable knob, a normally ineffective brake for engaging the knob input connection frictionally, a second input connection to said differential including a normally ineffective motive means and an irreversible transmitting device, and monitoring means for the system operable to render both said brake and motive means effective.

15. The combination, in a system of the class described, of an automatic pilot with a generator providing an output signal operable to maneuver the craft about an axis, a differential connected to the rotor of said generator, an input connection to said differential including a manually settable member, a normally open brake for engaging the member input connection frictionally, a second input connection to said differential including a normally unenergized electric motor, a normally open clutch, and an irreversible transmitting device, and monitoring means for the system operable to close said brake and clutch and energize said electric motor.

16. In a flight control system for aircraft, the combination of an automatic pilot having signal means operable to change the attitude of the craft about its pitch axis, differential means having an output operatively connected to said signal means, input means to said differential means including manually settable means for commanding a change in the attitude of the craft about its pitch axis and an irreversible transmitting connection, a second input means to said differential means including drive means and a second irreversible transmitting connection, means providing a measure of the angle of attack of the craft, and means for operating said drive means responsive to said angle of attack measuring means.

17. In a flight control system for aircraft, the combination of an automatic pilot having signal means operable to change the attitude of the craft about its pitch axis, differential means having an output operatively connected to said signal means, input means to said differential means including manually settable means for commanding a change in the attitude of the craft about its pitch axis and an irreversible transmitting connection, a second input means to said differential means including drive means and a second irreversible transmitting connection, means providing a measure of the lift of the craft, and means for operating said drive means responsive to said lift measuring means.

18. A stall monitoring flight control system for aircraft including an automatic pilot having signal means operable to change the attitude of the craft about its pitch axis, differential means having an output operatively connected to said signal means, input means to said differential means including manually setting means for commanding a change in the attitude of the craft and an irreversible transmitting connection, a second input means to said differential means including normally ineffective drive means and a second irreversible transmitting connection, means for sensing the approach of the craft to a stall condition, and means responsive to said sensing means for rendering said drive motor means effective to maneuver the craft automatically away from the sensed stall condition.

References Cited in the file of this patent

UNITED STATES PATENTS 2,736,856    Sasaki  ----------------  Feb. 28, 1956